United States Patent Office 3,605,501
Patented Sept. 20, 1971

---

3,605,501
METHOD FOR DETERMINING CLAY REACTIVITY
Martin E. Chenevert, Houston, Tex., assignor to Esso Production Research Company
Filed Mar. 16, 1970, Ser. No. 20,003
Int. Cl. G01n 25/56
U.S. Cl. 73—432
10 Claims

ABSTRACT OF THE DISCLOSURE

The capacity of a dehydrated drilling fluid sample to adsorb water under a fixed humidity environment is determined and compared to the capacity of a dehydrated standard material to adsorb water under the same environment. The ratio expresses the reactivity of the clay as related to the standard material.

BACKGROUND OF THE INVENTION

(1) Field of the invention

This invention relates to an analytic method for determining the reactivity of clay or other materials. The method can conveniently be used to determine the presence and relative proportions of inert solids in a drilling fluid.

(2) Description of the prior art

The most common type of drilling fluid used in rotary drilling operations is the water-base mud comprising a liquid phase of fresh water (less than 10,000 p.p.m. sodium chloride) and a solid phase composed of clays and weighting material. When reactive clays are mixed with fresh water, a colloidal suspension results. The character of the colloidal suspension determines the quality of the mud system and is largely dependent upon the hydration properties of the clays in the system. The various types of clays do not possess the same hydration properties. Bentonite, composed principally of the mineral sodium montmorillonite, exhibits the highest degree of hydration of all of the clays, and for that reason, predominates as the mud making material for fresh-water muds. Other clays such as kaolinite and the hydrous micas exhibit a lower degree of hydration and are therefore generally considered to be mud contaminants. These low grade clays are almost always present in the shale formations to be drilled. In order to maintain the quality of mud system, the quality control techniques should include methods for identifying the presence of low-grade clays and their effect upon the system.

A method currently used to characterize the clays of the system is the methylene blue dye test. This method measures the cationic exchange capacity of a mud sample by titration with methylene blue to a visual end point. Reactive clays such as bentonite have a high cationic exchange capacity while the low-grade clays exhibit a low cationic exchange capacity. However, the presence of organic materials such as polyacrylates, lignosulfonates, and lignites can cause errors in the final results. Moreover the visual end point is sometimes difficult to discern with certainty.

Thus, there exists a need for reliable field and laboratory analytical method for determining the type and relative proportions of clays in a mud system.

SUMMARY OF THE INVENTION

The present invention answers the need for a reliable analytical technique which accurately characterizes a clay containing material in accordance with the reactivity of its constituent clays. While the present invention is disclosed as a drilling mud analytic technique, the concept involved can be applied to characterize formation clays, or even in unrelated fields such as in the analysis of foundry sand. In short, the application of the present analytic technique can be as broad as the methylene blue dye test. The method is relatively simple, requiring equipment readily adaptable for field use as well as laboratory use. Briefly, the method comprises the steps of determining the hydration property of a dehydrated sample of the clay containing material under a controlled environment and comparing that property to the hydration property of a selected standard material determined under the same environmental conditions.

The hydration properties can be determined by a technique which measures the capacity of the clays to adsorb water under a fixed humidity environment. The amount of water adsorbed under the test conditions relates to the inherent adsorption characteristic of the material in question. In the typical drilling fluid application bentonite will be selected as the standard material. In this situation, the adsorptional characteristic of well-site bentonite and the dried solids of the mud sample are determined. The ratio of the latter to the former provides a quantitative measurement of the clay reactivity. The clay reactivity provides valuable information concerning the quality of the system. If the ratio approaches unity, the system is known to have clays possessing hydrational properties similar to those of Bentonite indicating that very little of the low-grade clays are present. A low ratio is evidence of the presence of large proportions of low-grade clays indicating the need for remedial measures for removing the undesirable solids from the system.

If barite or other inert weighting agents are present in the system, the relative proportions of the clay and barite can be determined on the basis of differential densities. The adsorptional characteristic for the mud solid samples is then determined on the basis of the adsorbent being the clay proportion of the sample. Alternately, the adsorption characteristic of the total solids can be determined and compared to the adsorptional characteristic of an uncontaminated mud at the same specific gravity. The latter technique lends itself to graphical solution for expediting the field application of the present invention.

DESCRIPTION OF THE PREFERRED EMBODIMENTS

Figure 1:
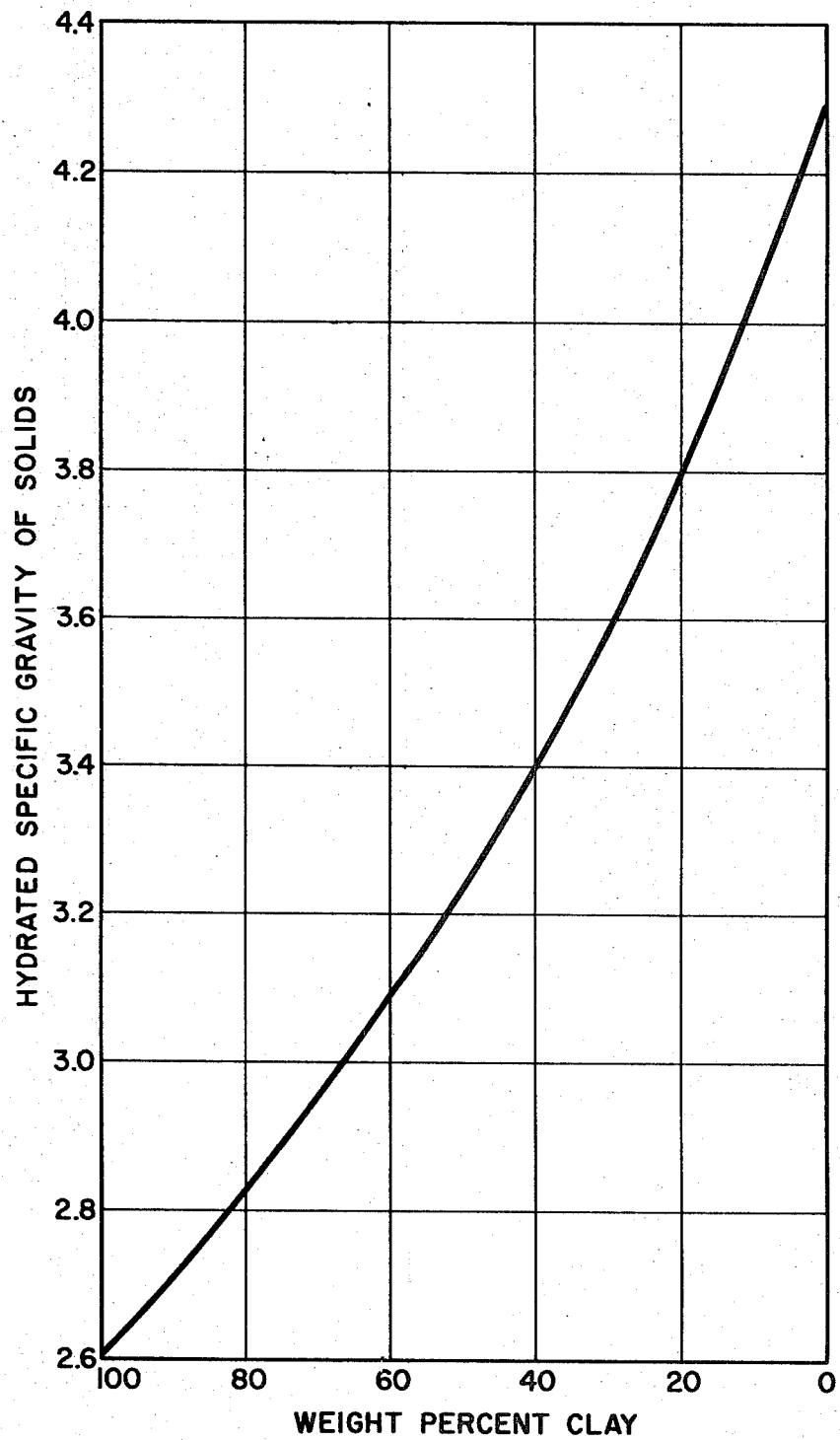
FIG. 1 is a graph showing the relationship of specific gravity of a barite-bentonite mud system and weight percent clay in the system.

In the drilling of wells with fresh-water drilling mud, the mud system can become contaminated with formation materials which alter the properties of the system. Shales containing high proportions of inert clays are the most troublesome because the clays form colloidal dispersions in the system making them difficult to remove. Sand, quartz, and other solids can generally be removed from the system by mechanical separation devices.

In order to maintain quality control over the system, the mud is generally analyzed periodically to determine the presence of clay contaminants and their effect on the system. A certain amount of clay contaminant can be tolerated but if the contaminating materials are permitted to accumulate, the properties of the mud system can be adversely affected.

The analytical technique according to the present invention provides a measurement of the hydration properties of the clay in the system. This hydration property is then compared to the hydration property of a selected standard mud-making material, the ratio representing a quantitative measurement of the reactivity of clays in the system.

For purposes of quality control of a drilling mud, the clay constituents can be divided into two characteristic types: (1) swelling or reactive clays and (2) nonswelling or inert clays. The reactive clays, typified by bentonite, exhibit a strong tendency to hydrate and disperse in the presence of fresh water, while the nonswelling variety exhibits only slight tendency to hydrate. The clay contaminants fall into the nonswelling type and are so classified because of their inert properties. These low-grade clays add very little to the mud-making quality of the total clays but if present in sufficient amounts unduly increase viscosity.

Bentonite exhibits the strongest tendency to hydrate having a yield of 90 barrels per ton of 15 centipoise mud (yield is defined as the number of barrels of mud having an apparent viscosity of 15 centipoise that can be made from one ton of clay). Thus, bentonite predominates the mud-making clay for fresh water muds. Because of its high reactivity, bentonite offers a convenient standard as a basis for comparing the mud-making ability of a clay. The hydration properties expressed as the adsorptional characteristic of the dehydrated mud sample are determined under controlled humidity environment and compared to the hydration properties of bentonite determined under identical test conditions. If the ratio is high, it is known that the system contains major proportions of reactive clays. The value of the ratio approximates the relative proportions of reactive clays in the system expressed as bentonitic equivalent. For example, if the ratio of the adsorptional characteristics is 0.8, it is known that the clays contain about 80% bentonite or bentonitic equivalent and about 20% of the inert clays.

The hydration properties of the clay samples can be determined by the adsorptional technique mentioned above. The technique comprises the steps of drying the samples, weighing the dried samples, exposing the dried samples in a controlled humidity environment, and finally weighing the hydrated samples to determine mass of water adsorbed. The mass adsorption is referred herein as the adsorption characteristic of the material in question and can be expressed as weight percent of water adsorbed or as weight of water adsorbed.

The equipment required for carrying out the method according to the present invention is conventional: an air comparison pycnometer, a retort, a sorption desiccator, and an analytical balance.

The samples are dried by placing them in a retort maintained at about 220° F. for about 2 hours. The dried solids are then weighed on an analytical balance and placed in a sorption desiccator maintained at a controlled relative humidity. The relative humidity in the preferred range of 30–90% can be controlled by an aqueous solution of predetermined activity. For example, if a relative humidity of about 50% is desired, the aqueous solution can be saturated with calcium nitrate which provides an activity of .505. Since activity is defined as the ratio of the aqueous vapor pressure of the saturated salt solution to the aqueous vapor pressure of pure water, a relative humidity of 50.5% is maintained in the desiccator.

For purposes of field tests, it is not necessary that the sample remain in the desiccator until equilibrium is established. Laboratory tests have shown that sufficient hydration occurs in about 24 hours to provide a reliable measurement of the sample adsorption characteristic. The hydrated samples are weighed to determine mass of water adsorbed by the clays.

The adsorption characteristic of the clays is defined herein as the weight percent of water adsorbed under the controlled humidity environment and can be expressed as follows:

$$\text{Adsorption characteristic} = \frac{(M_w)(100)}{(M_c)}$$

where $M_w$ = mass of water adsorbed under the controlled humidity environment.
$M_c$ = mass of the dehydrated sample.

Now, when the adsorption characteristic of the clays in the mud is compared to the adsorption characteristic of the standard material, a measurement of the clay reactivity as expressed in relation to the reactivity of the standard material is obtained:

Clay reactivity $$= \frac{\text{Adsorption characteristic of clay sample}}{\text{Adsorption characteristic of standard material}}$$

In the typical application of this method in rotary drilling operations, bentonite will be the standard material because of its high reactivity.

If barite is in the mud system, the relative proportion of barite, reactive clays, and inert clays can be determined by equation or by a graphical solution.

Using equations, the adsorption characteristic of the clay proportion of the total solids is determined as follows:

Adsorption characteristic of the clays in the system $$= \frac{(M_w)}{(M_s)(P_c)}$$

where $M_s$ = mass of the dehydrated total solids sample
$P_c$ = weight fraction of clay in the system The analytic procedure requires the measurement of the weight of the sample before and after hydration and the measurement of the specific gravity of the hydrated sample. The weight percent of the clay in the system can be obtained from FIG. 1 which was prepared from data presented in an American Petroleum Institute publication: API RP 29, fourth edition, May 1957. As discussed later, knowledge of $P_c$ and clay reactivity values permits determination of the relative proportions of barite, bentonite, and inert solids in the mud system.

The graphical solution is based upon the following observed facts: (1) hydrated clays have a specific gravity in the order of 2.60; (2) barite has a specific gravity in the order of 4.25; (3) barite is inert having an adsorptional characteristic of zero; (4) the adsorption characteristic of a barite and bentonite mixture is linearly proportional to the weight percent of bentonite component, at least within a limited range.

The graph is prepared by measuring the specific gravity and the adsorption characteristic of the total solids containing only bentonite and barite and proportioned to provide about the desired mud weight. These data locate point A on coordinate graph having a specific gravity scale between 2.6 (clay value) and 4.25 (barite value) on the abscissa, and an adsorption characteristic scale between 0 and about 5.0 on the ordinate (see FIG. 2). The abscissa can also be provided with a weight percent clay scale prepared from FIG. 1. A straight line 10, through point A, intersects the specific gravity scale at 4.25 (barite value) indicated by reference 11. Line 10 intersects the adsorption characteristic scale (clay value) at a point 12. Line 10 represents an uncontaminated mud system or a clay reactivity (CR) of 1.0. Lines representing various degrees of clay contamination can be drawn by dividing the adsorption characteristic scale between 0 value and point 12 into fractions and connecting each of the division points to point 11. Lines 13-17 represent various degrees of contamination and correspond to CR values of 0.9–0.5 respectively.

By knowing the hydrated specific gravity and adsorptional characteristic of the total solids, a point, e.g. B, can be plotted on the graph and the clay reactivity determined by interpolating between the series of lines 13-17. At point B, the clay reactivity is about .82. This indicates that the clays in the mud are equivalent to a system which contains about 82 weight percent bentonite and about 18 weight percent inert clays. The relative proportions of barite, bentonite, and inert clays then can be determined by using weight percent scale and calculated as follows:

Weight percent clay=31 (from graph)
Weight percent barite=69; (100−31)

$$\text{Weight percent bentonite} = \frac{(31)(82)}{(100)}$$

Weight percent bentonite=25
Weight percent inert clays=(31−25)
Weight percent inert clays=6

Figure 2:
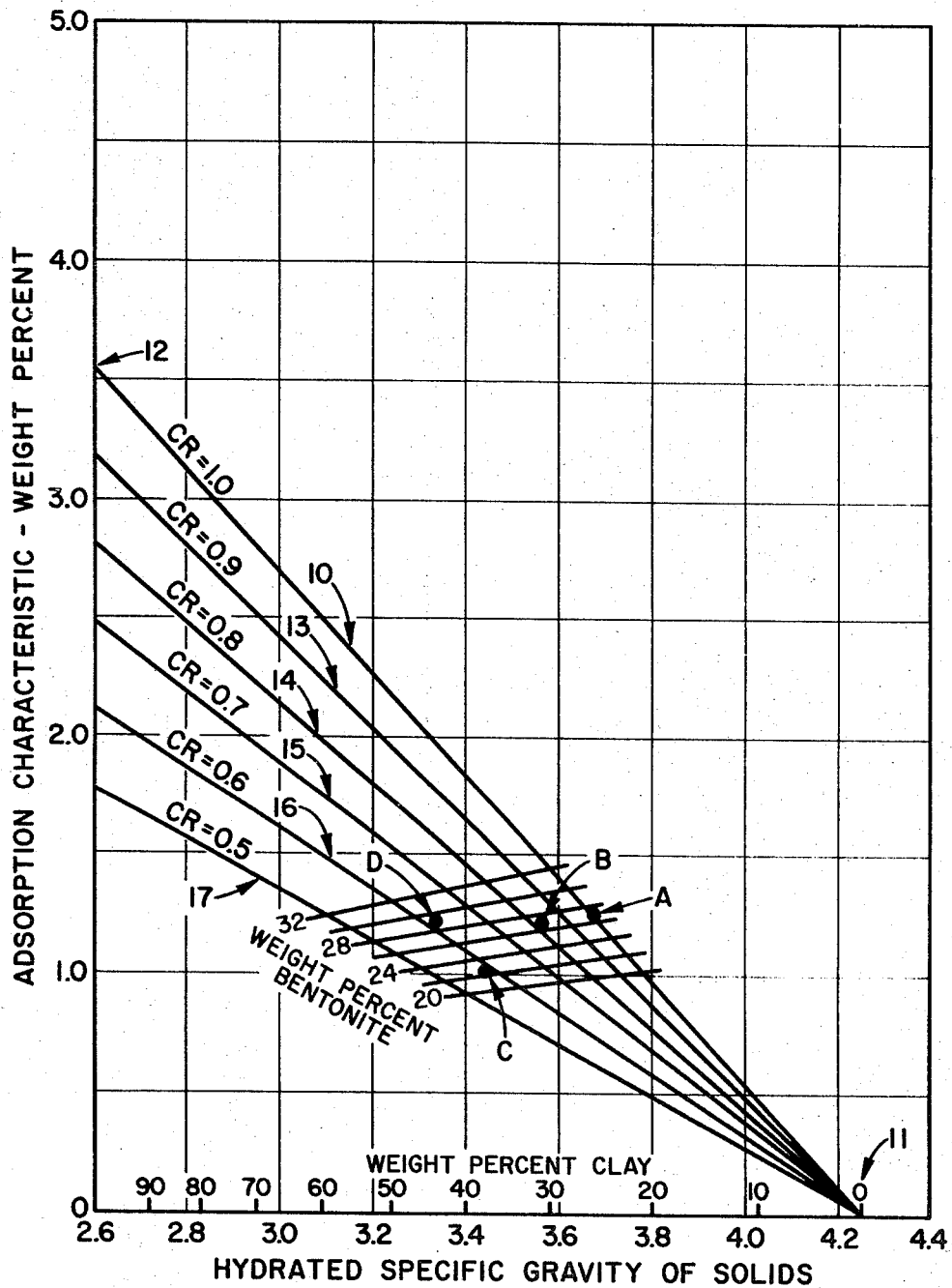
FIG. 2 is a graph prepared according to the present invention for a ten-pound-per-gallon mud system.

However, weight percent bentonite lines can be drawn on FIG. 2 by using the data from FIG. 1 and data from lines 10–17 of FIG. 2. Thus, at point B, the mud system contains about 31 weight percent total clay (weight percent scale), about 25 weight percent bentonite (weight percent bentonite scale) and about 6 weight percent inert clays (31−25=6); and about 69 weight percent barite (100−31=69).

The contemplated analytic technique can be used for determining properties of a clay containing material (Example I) or can be used for monitoring the quality of a drilling fluid (Examples II and III).

EXAMPLE I

Samples of Wyoming bentonite, barite, and four shales were analyzed by the following procedure. The samples in separate containers were dehydrated in a retort at 220° F. for 16 hours. The samples were weighed and placed in a sorption desiccator maintained at a relative humidity of about 50% by water saturated with calcium nitrate. After 24 hours, the samples were removed from the desiccator and reweighed to determine water adsorbed. The specific gravities of the dried and hydrated samples were measured by a pycnometer. The following presents the observed and calculated data of Example I.

|  | Specific gravity Dry | Specific gravity Hydrated | Adsorption characteristic, wt. percent water adsorbed | Clay reactivity |
|---|---|---|---|---|
| Bentonite | 3.45 | 2.57 | 6.1 | 1.00 |
| Shale: |  |  |  |  |
| A | 2.85 | 2.76 | 0.93 | 0.15 |
| B | 2.94 | 2.71 | 1.33 | 0.22 |
| C | 3.64 | 2.63 | 3.90 | 0.64 |
| D | 3.06 | 2.64 | 2.40 | 0.39 |
| Barite | 4.26 | 4.25 |  | 0 |

In this example, bentonite was selected as the standard material and provided the basis for determining the clay reactivity of the shales. As indicated by the clay reactivity column, all the shales, except C, were relatively inert having clay reactivity values below 0.4. The compositions of the shales were as follows:

|  | Wt. percent |  | Wt. percent |
|---|---|---|---|
| Shale A: |  | Shale B: |  |
| Quartz | 20.1 | Quartz | 51.4 |
| Feldspar | 0.6 | Feldspar | 13.3 |
| Chlorite | 13.0 | Calcite | 1.2 |
| Clays: |  | Chlorite | 9.1 |
| Illite | 38.8 | Clays: Illite | 25.0 |
| Kaolinite | 9.4 |  |  |
| Illite-montmorillonite | 18.1 |  |  |
| Shale C: |  | Shale D: |  |
| Quartz | 9.4 | Quartz | 43.6 |
| Calicite | 2.7 | Feldspar | 27.7 |
| Clays: |  | Calcite | 13.4 |
| Illite | 33.6 | Clays: |  |
| Kaolinite | 6.7 | Illite | 5.5 |
| Montmorillonite | 47.6 | Montmorillonite | 9.8 |

Shales C and D would be expected to be fairly reactive because of the presence of montmorillonite. The analytical technique according to the present invention reveals the effect the shales would have on a drilling fluid. For example, in drilling through Shales A and B which contain predominantly inert materials, mud contamination would be expected to be a serious problem. However, in drilling through Shale C, the condition of the mud should be unaltered because of the presence of large quantities of mud-making material.

EXAMPLE II

Bentonite, barite, and fresh water were mixed in the proper proportion to make a ten-pound-per-gallon, 15 centipoise mud. Four samples of the mud were taken (Samples 1, 2, 3, and 4). Shale B described in Example I was added to samples 2, 3, and 4 in sufficient amounts to constitute about 20 weight percent, 40 weight percent, and 50 weight percent, respectively, of the total clays in the samples.

Each sample was analyzed as follows:

(1) The samples were dehydrated in a retort maintained at 220° F. for 24 hours.
(2) The dehydrated samples were weighed.
(3) The samples were placed in a sorption desiccator having a controlled relative humidity environment of 50.5% for 24 hours.
(4) The hydrated samples were weighed.
(5) The mass of water adsorbed and adsorption characteristic for each sample was computed.
(6) The specific gravity of the hydrated samples were measured by an air comparison pycnometer.

The graph of FIG. 2 was prepared from the following data:

| Sample | Point on FIG. 2 | Composition and weight percent | Adsorption characteristic (wt. percent of total solids) | Hydrated specific gravity total solids |
|---|---|---|---|---|
| 1 | A | Barite, 76.0; bentonite, 24.0; shale, 0 | 1.26 | 3.67 |
| 2 | B | Barite, 70.2; bentonite, 23.7; shale, 6.1 | 1.21 | 3.56 |
| 3 | C | Barite, 60.6; bentonite, 23.4; shale, 16.0 | 1.05 | 3.44 |
| 4 | D | Barite, 53.2; bentonite, 23.1; shale, 23.7 | 1.22 | 3.33 |

Point A was located on the graph and lines 10, 13–17 drawn in the manner previously described. The weight percent bentonite lines and scale were added. Points B, C, and D were then plotted. Points A, B, C, and D give the following data for samples 1, 2, 3, and 4, respectively.

| Sample | Point on graph | Clay reactivity | Weight percent | | | |
|---|---|---|---|---|---|---|
| | | | Clay | Bentonite | Inert clay | Barite |
| 1 | A | 1.0 | 25 | 25 | 0 | 75 |
| 2 | B | 0.82 | 31 | 25 | 6 | 69 |
| 3 | C | 0.59 | 38 | 22 | 16 | 62 |
| 4 | D | 0.61 | 44 | 27 | 18 | 54 |

Except for sample 4, the analytically-determined proportions of barite, bentonite, and inert clays compared well with the actual composition of the prepared samples.

EXAMPLE III

Figure 3:
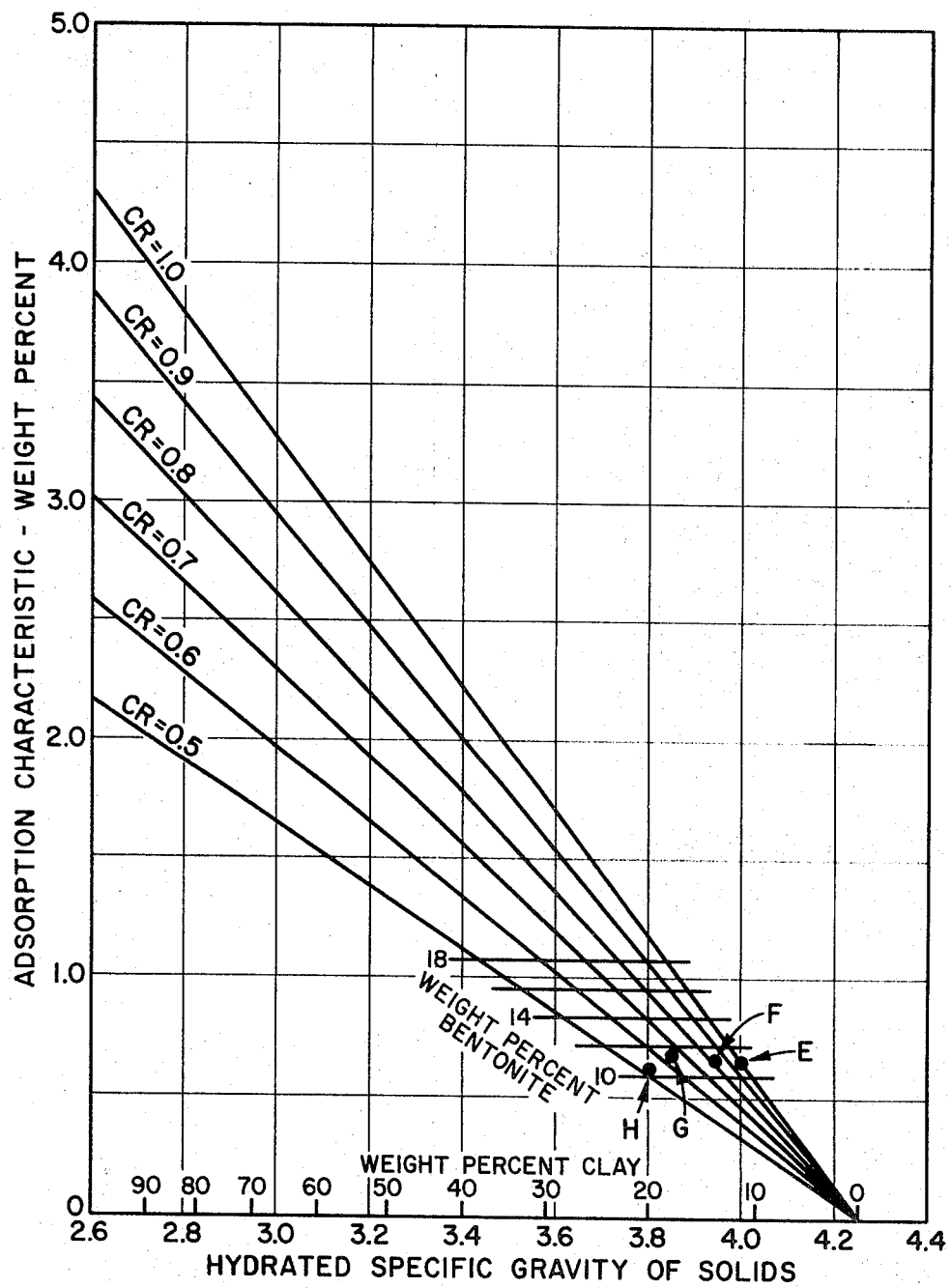
FIG. 3 is a graph prepared according to the present invention for a twelve-pound-per-gallon mud system.

Bentonite, barite, and fresh water were mixed in proper proportions to make a twelve-pound-per-gallon, 15 centipoise mud. Four separate samples were taken from the mud (Samples 5, 6, 7, and 8). Shale B was added in the samples 6, 7, and 8 in sufficient amounts to constitute about 20 weight percent, 40 weight percent, and 50 weight percent, respectively of the total clays in the samples. The samples were analyzed as in Example II and the graph of FIG. 3 prepared from the following data:

| Sample | Point on FIG. 3 | Composition and weight percent | Adsorption characteristic (weight percent of total solids) | Hydrated specific gravity total solids |
|---|---|---|---|---|
| 5 | E | Barite, 90.4; bentonite, 10.6; shale, 0 | 0.64 | 3.99 |
| 6 | F | Barite, 86.8; bentonite, 10.6; shale, 2.6 | 0.66 | 3.94 |
| 7 | G | Barite, 82.5; bentonite, 10.5; shale, 7.0 | 0.69 | 3.85 |
| 8 | H | Barite, 79.0; bentonite, 10.5; shale, 10.5 | 0.63 | 3.80 |

Points E, F, G, and H on the graph give the following data for samples 6, 7, 8, and 9, respectively:

| Sample | Point on graph | Clay reactivity | Weight percent | | | |
|---|---|---|---|---|---|---|
| | | | Clay | Bentonite | Inert clay | Barite |
| 5 | E | 1.00 | 11 | 11 | 0 | 89 |
| 6 | F | .82 | 14 | 11 | 3 | 86 |
| 7 | G | .65 | 17 | 12 | 5 | 83 |
| 8 | H | .52 | 19 | 10 | 9 | 81 |

The analyzed data compared well with the actual composition of the samples.

In summary, then, the present invention provides an analytic technique for characterizing clays according to their reactivity. The laboratory analysis of prepared samples according to this technique was found to be well within the accuracy requirements of drilling operations.

What is claimed is:

1. A method of determining the weight percent of reactive clays in a clay containing material comprising the steps of:
   (a) determining the adsorption characteristic of the clay containing material under a fixed humidity environment;
   (b) determining the adsorption characteristic of a highly reactive clay under the same humidity environment; and
   (c) comparing the adsorption characteristics of the clay containing material to the adsorption characteristic of the highly reactive clay, the ratio representing the weight percent equivalent of said highly reactive clay in the clay containing material.

2. The invention as recited in claim 1 wherein the fixed humidity environment is maintained at a relative humidity between about 30 and about 90 percent.

3. The invention as recited in claim 1 wherein said highly reactive clay is bentonite.

4. The invention as recited in claim 1 wherein said fixed humidity environment is provided by a sorption desiccator containing a saturated aqueous solution having an activity from about .3 to about .9.

5. A method of determining clay reactivity of clays in a drilling fluid containing bentonite, said method comprising the steps of:
   (a) dehydrating a sample of said drilling fluid to total solids;
   (b) placing said dehydrated total solids in a controlled humidity environment for a predetermined time period;
   (c) determining the adsorption characteristic of the clays in the sample under said fixed humidity environment; and
   (d) comparing the adsorption characteristic of the clays to the adsorption characteristic of bentonite determined under the same controlled humidity environment, the ratio representing the clay reactivity of the system.

6. A method of determining weight percent of reactive clays in a drilling fluid composed of bentonite, an inert weighting material, and water, said method comprising the steps of:
   (a) dehydrating a sample of said drilling fluid to total solids;
   (b) placing said dehydrated total solids in a controlled humidity environment for a predetermined test period;
   (c) determining the adsorption characteristic of the total solids hydrated in step (b);
   (d) measuring the specific gravity of the total solids hydrated in step (b);
   (e) determining the adsorption characteristic of a mixture of bentonite and the weighting material at about the same specific gravity determined in step (c) and at the same controlled humidity environment of step (b);
   (f) comparing the adsorption characteristic of step (c) to the adsorption characteristic of step (e), the ratio representing the reactivity of the clays in the drilling fluid;
   (g) determining the weight percent of total clays in the drilling fluid; and
   (h) multiplying the clay reactivity and the weight percent of clays in the drilling fluid, the product representing the weight percent of bentonite in the drilling fluid.

7. The invention as recited in claim 6 wherein the controlled humidity environment is provided by a sorption desiccator containing an aqueous solution having an activity in the range from about .3 to about .9.

8. The invention as recited in claim 7 wherein aqueous solution is saturated with calcium nitrate.

9. The invention as recited in claim 8 wherein the predetermined time period of step (b) is about 24 hours.

10. The invention as recited in claim 8 wherein the specific gravity of the hydrated total solids is measured by an air comparison pycnometer.

References Cited

UNITED STATES PATENTS 2,575,169  11/1951  Green ---------------- 73—73

OTHER REFERENCES

Composition and Properties of Oil Well Drilling Fluids: W. F. Rogers, Gulf Publishing Company (Houston, 1964), pp. 174–78.

RICHARD C. QUEISSER, Primary Examiner

C. E. SNEE III, Assistant Examiner

U.S. Cl. X.R.

73—53, 73, 76